July 12, 1966  F. BRÄUNIG ETAL  3,260,341
OPERATION CONTROL CIRCUIT ARRANGEMENT
FOR TYPEWRITERS OR THE LIKE
Filed Nov. 27, 1964  5 Sheets-Sheet 1

INVENTORS
BY: Friedrich Bräunig
Dieter Folkens
their ATTORNEY:
Richard J. Striker

United States Patent Office 3,260,341
Patented July 12, 1966

3,260,341
OPERATION CONTROL CIRCUIT ARRANGEMENT
FOR TYPEWRITERS OR THE LIKE
Friedrich Bräunig and Dieter Folkens, Wilhelmshaven, Germany, assignors to Olympia Werke A.G., Wilhelmshaven, Germany
Filed Nov. 27, 1964, Ser. No. 414,226
Claims priority, application Germany, Nov. 27, 1963, O 9,804
19 Claims. (Cl. 197—19)

The present invention relates to an operation control circuit arrangement. More particularly, the invention relates to an operation control circuit arrangement for selective switching of various operations, programs or control processes such as, for example, computer operations or tape recording or perforation.

Operation control circuit arrangements of known type for typewriters, computers or similar apparatus utilize switching apparatus controlled by tripping cams supported by an extension of the carriage as the carriage is shifted in control or switching steps.

Although the known tripping cam control arrangement may control operations, programs or control processes in the control apparatus itself or in apparatus connected to it in series or in parallel, each program requires a plate having several apertures formed therein corresponding to the number of equipment units to be controlled. Each plate must be positioned in operative proximity with the carriage of the apparatus. The apertures are for the tripping cams. The known tripping cam control arrangement is heavy and cumbersome. Furthermore, such tripping cam control arrangement restricts the typing speed and is expensive.

In other known control apparatus, the tripping cams may be set by hand or via a keyboard, similarly to tabulator stops, and may be cleared as required. This increases the number of possible variations. Furthermore, the control operation may be initiated and interrupted from any position of the carriage. A disadvantage of such apparatus is the great amount of energy necessary to operate the tripping cams. Also, each tripping cam may control only one corresponding switch at a time.

Other types of control apparatus utilize a sliding control which moves synchronously with the carriage and contacts positioned contacts arranged in accordance with the type spacing. Although the switching arrangement of such apparatus is simple, as far as the control operation is concerned, the variation and selection possibilities for operations, programs or control processes are so limited that such apparatus is used only very limitedly for very limited operations.

The operation control circuit arrangement of the present invention overcomes and eliminates the disadvantages of the known control apparatus. Thus, for example, the initiation and interruption or termination of the control operation is achieved with great facility, the variation and selection possibilities for operations, programs or control processes are very great, and the structure is simple and utilizes a minimum number of components.

The operation control circuit arrangement of the present invention utilizes a single control plate, bar or member and exchangeable flexible electric conductors or leads are utilized to connect various contacts of the apparatus. A control unit is electrically connected to a typewriter unit and the exchangeable flexible electric conductors interconnect various contacts on the control plate, in the control unit and in the typewriter unit and the control unit.

The utilization of exchangeable flexible electric conductors or leads in the operation control circuit arrangement of the present invention, and the utilization of switching apparatus controlled by relays included in the arrangement, enables the single control plate and the same control unit to provide a great number of various selection possibilities for operations, programs or control processes. Also, the operation control circuit arrangement of the present invention enables many operations, programs or control processes to be controlled by the carriage setting. Such control by the carriage setting may be achieved during the forward movement of the carriage or during the return movement of the carriage.

The control plate of the operation control circuit arrangement of the present invention is removably supported by the typewriter unit at the back of said typewriter unit and includes a current supply line. The current supply line is sequentially connected to a plurality of position contacts on the control plate by a contact brush positioned at the carriage of the typewriter unit. The position contacts are grouped in accordance with the control steps. A position contact is provided for each carriage setting.

In the operation control circuit arrangement of the present invention, the current supply line is positioned along one longitudinal edge of the control plate. The position contacts are arranged on the control plate substantially perpendicularly to the current supply line and comprise conductor strips of substantially equal length. The position contacts are connected to exchangeable flexible leads which connect them to a plurality of connecting blocks. The connecting blocks are positioned along the longitudinal edge of the control plate opposite that along which the current supply line is positioned. Each of the connecting blocks functions to connect several exchangeable flexible leads.

The space of the control plate of the operation control circuit arrangement of the present invention is utilized efficiently by utilizing alternate long and short connecting strips for the position contacts. The arrangement of the position contacts and connecting strips permits any desired interconnection of position contacts and any desired connection of position contacts and connecting blocks. The connecting strips and the connecting blocks may be provided with terminals, plugs or sockets to enable removable connection thereto of the exchangeable flexible leads. The connecting strips and the connecting blocks may, if desired, be soldered at one or both surfaces to the exchangeable flexible leads.

The exchangeable flexible leads may be connected to the connecting strips and the connecting blocks by plugs, sockets, terminals or solder for a specific operation, program or control process. When the operation, program or control process is to be changed, either the control plate must be changed, or the plugs, sockets or terminals connections must be changed, or the soldered connections have to be removed, changed and resoldered in accordance with the new operation, program or control process.

In a preferred embodiment of the invention, the connecting strips and the connecting blocks are of planar configuration and are sheet-like. The exchangeable flexible leads may then be positioned on a surface of the control plate as a permanent or printed circuit with flexible contact terminals. In such a case, a different control plate may be utilized for each operation, program or control process.

In the operation control circuit arrangement of the present invention, a plurality of control switches in the circuit are relay contacts, switches or armatures of control relays having relay windings connected in the control unit in accordance with selected operations, programs or control processes by flexible leads. This connection of the control relays enables a greater selection possibility of operations, programs or control processes.

Push button switches may be utilized as the energizing switches of the control relays. Such push button switches may be operated by manually operated keys such as, for example, keys of the typewriter unit keyboard. Thus, for example, numeral keys 1, 2 and 3 of the typewriter keyboard may be utilized to energize the windings of the control relays for operations, programs or control processes 1, 2 and 3.

In the operation control circuit arrangement of the present invention, the typing of numbers during the selection of the operation, program or control process is prevented by selection switches or selection armatures connected in the circuits of the control relays. The selection switches are controlled by selection relays having energizing windings which may be controlled by the carriage of the typewriter unit when said carriage is between its pretyping end position and its type starting position. Furthermore, the selection switches or armatures of the selection relays cooperate with keyboard locking apparatus which prevents the operation of the keys for energizing the control relays when the carriage is in determined positions. This assures the selection of an operation, program or control process prior to actual typing. It also assures that the selection of an operation, program or control process does not occur during typing.

The various exchangeable flexible leads may be connected to contacts on the control plate by terminals, plugs, sockets or solder or they may be affixed to or printed on the control plate and they may be provided with flexible contacts.

In order that the present invention may be readily carried into effect, it will now be described with reference to the accompanying drawings, wherein:

FIG. 3, comprising

FIG. 4, comprising FIG. 5, comprising

In the figures, the same components are identified by the same reference numerals.

Figure 1:
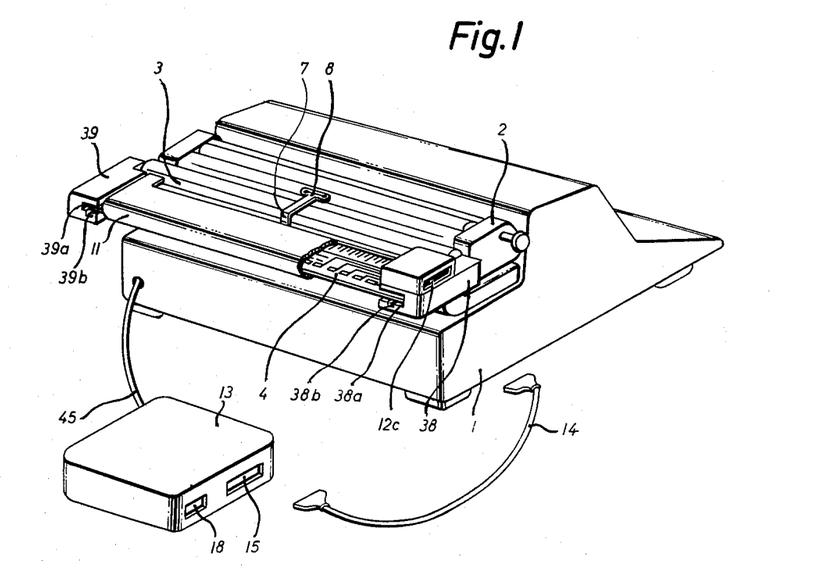
FIG. 1 is a perspective view of an embodiment of a typewriter unit and a control plate and control unit of the present invention.

In FIG. 1, the operation control circuit arrangement of the present invention is affixed to a typewriter unit 1. A control plate, bar or member 4 is removably affixed to the back of the typewriter unit 1. The control plate 4 may be positioned substantially perpendicularly to a frame plate 3 of the typewriter unit 1. Of course, any suitable arrangement may be utilized for removably mounting the control plate 4 on the typewriter unit 1.

The back of the typewriter unit 1 is the preferred location for the mounting of the control plate 4, although said control plate may be mounted on said typewriter unit at any suitable location. Holding members 38 and 39 are mounted on the typewriter unit 1 and may be positioned on the carriage frame plate of said typewriter unit. Each of the holding members 38 and 39 has a receiving slot 38a and 39a, respectively, formed therein. The receiving slot 38a of the holding member 38 has a groove 38b formed therein and the receiving slot 39a of the holding member 39 has a groove 39b formed therein. Each of the grooves 38b and 39b has a resilient clamp 40 (FIG. 2) positioned therein for assisting in holding the control plate 4 in position.

Figure 2:
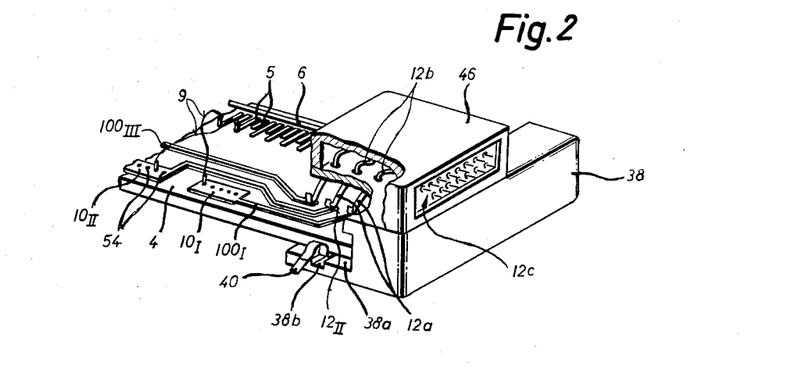
FIG. 2 is a perspective view of a portion of the embodiment of FIG. 1.
Figure 5A:
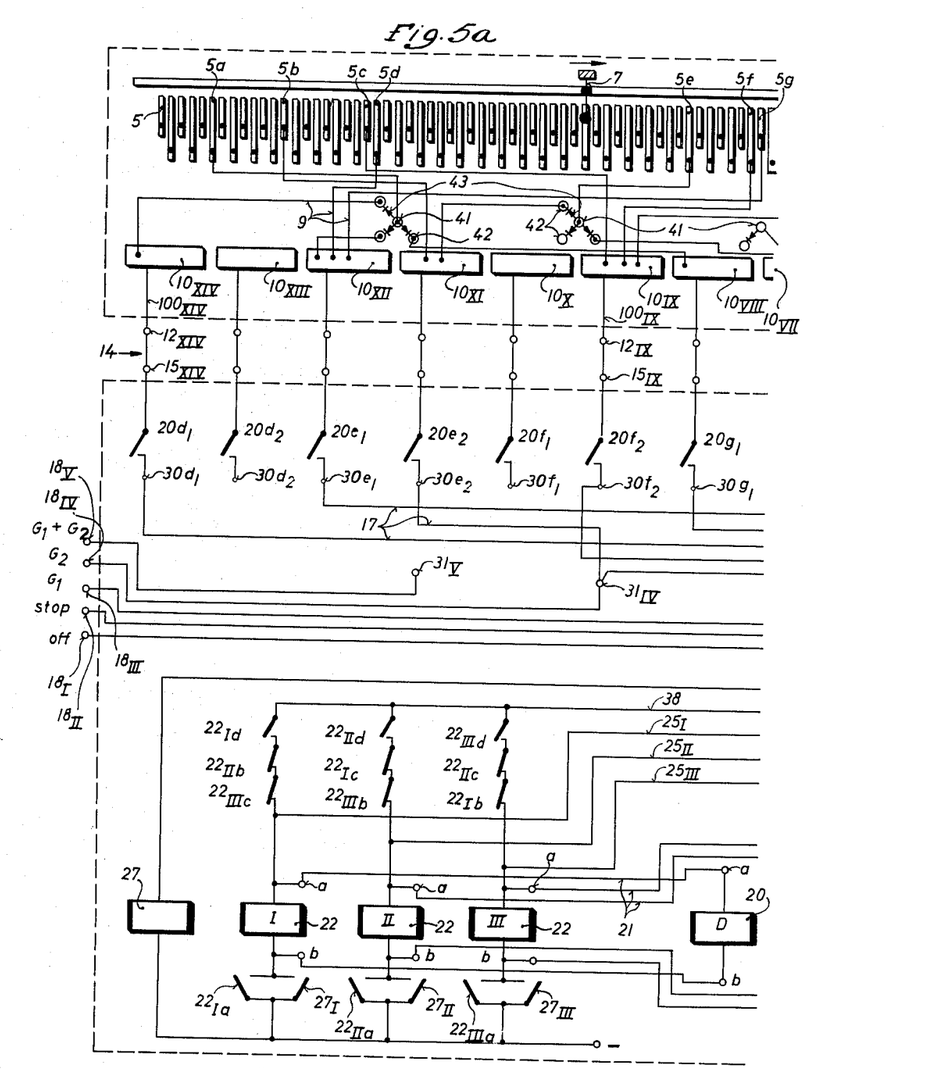
FIGS. 5a and 5b, is a circuit diagram of the embodiment of FIG. 1.
Figure 5B:
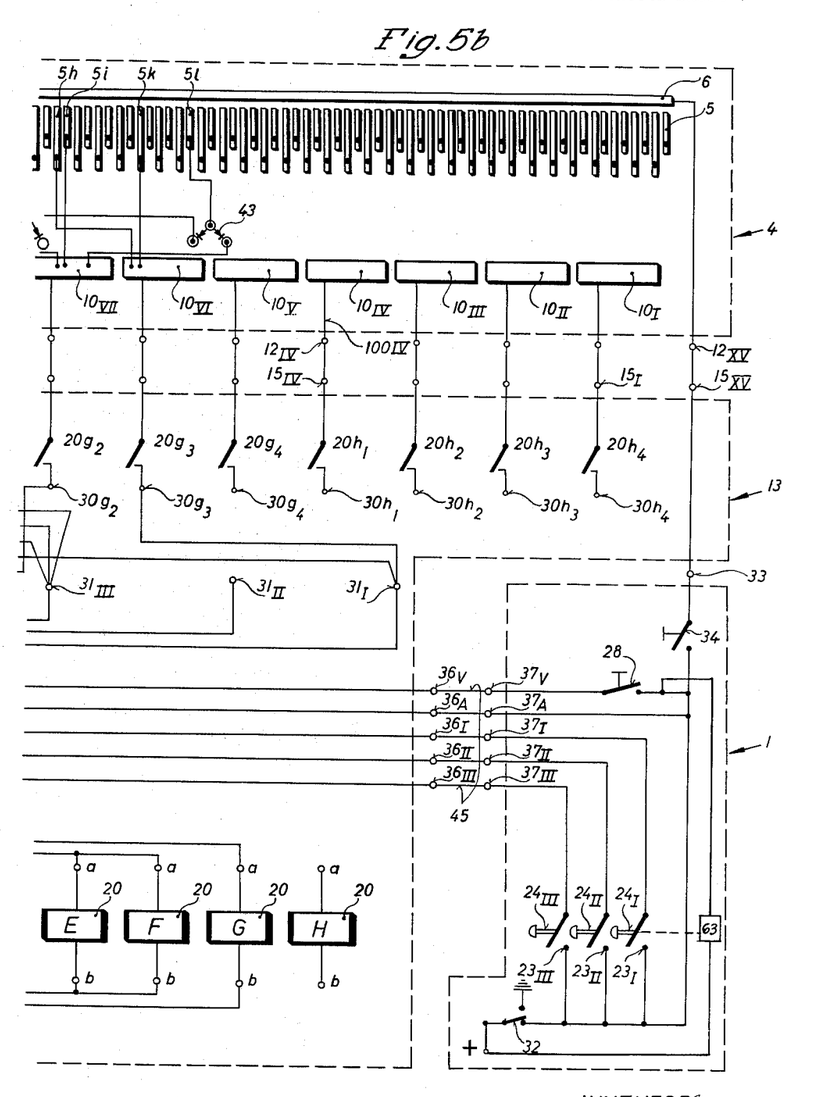

A contact brush 7, supported by a brush holder 8, connects a current supply line 6 of the control plate 4 in sequence to a plurality of position contacts 5 of said control plate. The position contacts 5 are connected to a plurality of connecting blocks 10 via a first plurality of exchangeable flexible leads 9. The connecting blocks $10_I$ to $10_{XIV}$ are connected to corresponding ones of contact terminals $12_I$ to $12_{XIV}$ via corresponding ones of a plurality of lead strips $100_I$ to $100_{XIV}$ (FIGS. 2, 3 and 5).

The control plate 4 may be covered by a cover 11. The cover 11 has a longitudinally extending slot formed therethrough through which the contact brush 7 passes. The typewriter unit 1 is connected to a control unit 13 via a plurality of leads 45 (FIGS. 1 and 5) and the control unit 13 is connected to the control plate 4 via a plurality of leads 14 (FIGS. 1 and 5). A plurality of operation contact terminals 18, comprising terminals 18I to 18V, are included in the control unit 13 and may be connected to equipment for performing the selected operation or control process or for providing the selected program.

Figure 3A:
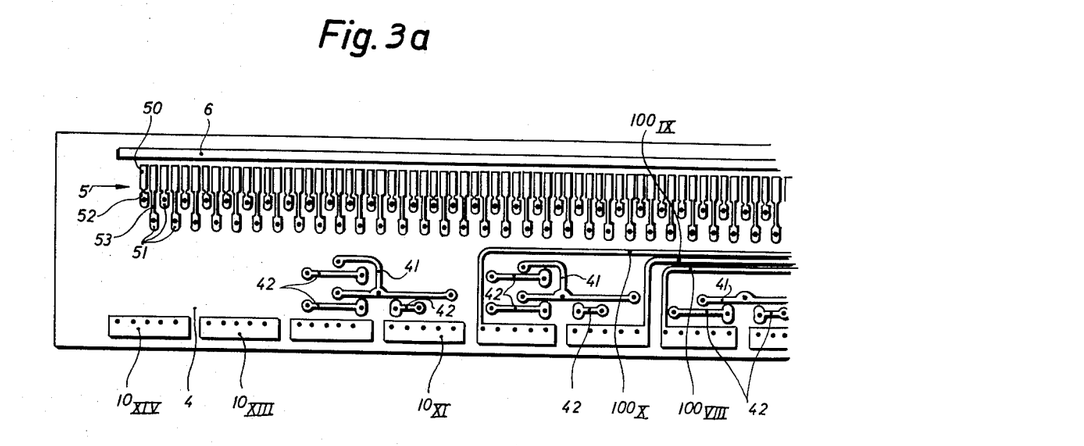
FIGS. 3a and 3b, is a top view of an embodiment of a control plate of the present invention.
Figure 3B:
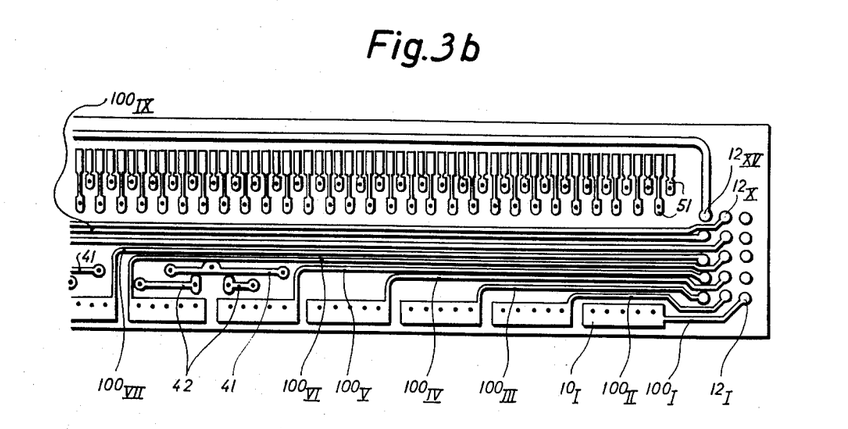
Figure 4A:
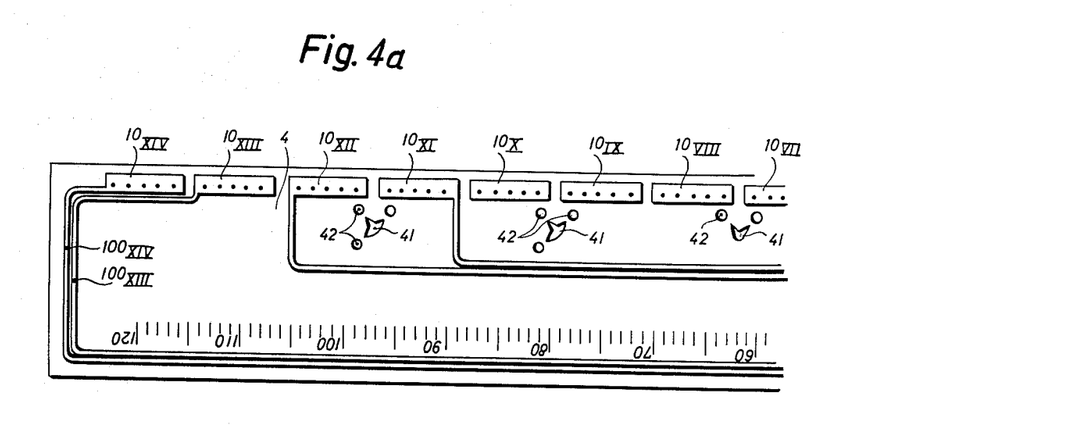
FIGS. 4a and 4b, is a bottom view of the embodiment of FIG. 3.
Figure 4B:
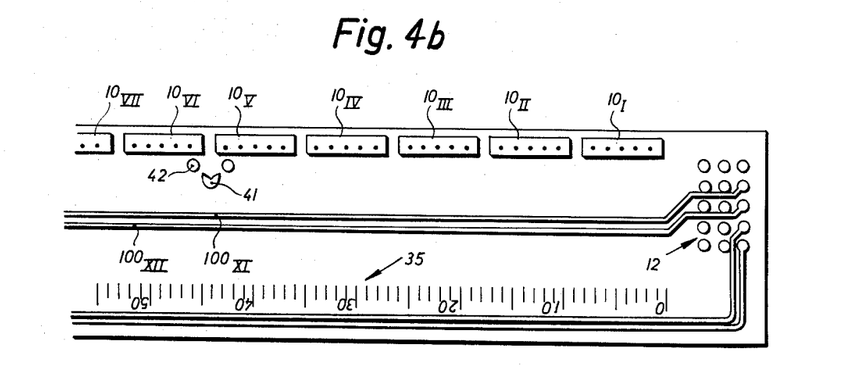

FIGS. 3 and 4 are top and bottom views of an embodiment of the control plate, bar or member 4 of the present invention. In the embodiment of FIGS. 3 and 4, the control plate 4 supports printed circuitry on both of its substantially planar surfaces. The current supply line 6 is connected at one of its ends to a contact terminal $12_{XV}$. The position contacts 5 are positioned on the control plate in proximity with the current supply line 6 transverse to said current supply line and may be substantially perpendicular to said current supply line. The position contacts 5 are positioned in accordance with the type spacing. A position contact 5 is provided for each switching step.

Each of the position contacts 5 comprises a lead strip 50; the lead strips 50 of all the position contacts 5 being of equal length. Each of the lead strips 50 is joined to connecting strip 51. Alternate ones of the lead strips 50 are joined to corresponding connecting strips 51 via short joining strips 52 and the other alternate ones of the lead strips 50 are joined to corresponding connecting strips 51 via long joining strips 53. As shown in FIG. 3, there are 121 position contacts 5 in the illustrated embodiment of the control plate 4. The connecting strips 51 are so spaced that the exchangeable flexible leads may be connected thereto with facility and rapidity. The suitable spacing of the connecting strips 51 is achieved by the joining strips 52 and 53.

The connecting blocks 10 are positioned along the longitudinal edge of the control plate 4 opposite that along which the current supply line 6 is positioned. The connecting blocks 10 include the connecting blocks $10_I$ to $10_{XIV}$. As illustrated in FIG. 3, a plurality of contacts such as, for example, five, may be provided on each of the connecting blocks $10_I$ to $10_{XIV}$ for the exchangeable flexible leads 9.

The contact terminals $12_I$ to $12_{XV}$ are positioned along one of the transverse edges or sides of the control plate 4 in the embodiment of FIG. 3. As shown in FIG. 4, which is a bottom view of the control plate 4, the lead strips $100_I$ to $100_{XIV}$ are supported by the bottom surface of said control plate as a printed circuit and connect the corresponding connecting blocks $10_I$ to $10_{XIV}$ to the corresponding contact terminals $12_I$ to $12_{XIV}$.

The contact terminals $12_I$ to $12_{XV}$ are electrically connected to a terminal board or plug board 12c via spring-type contacts 12a and electric leads 12b supported by the holding member 38. The terminal board or plug board 12c is supported by an ancillary portion 46 of the holding member 38. The plug board 12c enables any desired number of control plates 4 to be connected to the control unit 13 by merely making electrical contact between said control unit and said plug board.

A plurality of connecting joining strips 41 and corresponding connecting strip leads 42 are positioned on the control plate 4. Each connecting joining strip 41 is connected to various connecting strip leads 42 through corresponding diodes 43 (FIG. 5) which permit current to flow only from a connecting joining strip 41 to the corresponding connecting strip leads 42, and not from strip leads 42 to strips 41. The strips 41 and the strip leads 42 enable the interconnection of the exchangeable flexible leads of the first plurality of exchangeable flexible leads 9 so that, for example, a plurality of position contacts 5 may be electrically interconnected or a plurality of connecting blocks 10 may be electrically interconnected.

FIG. 5 is a circuit diagram of an embodiment of the operation control circuit arrangement of the present invention. The control plate 4 is positioned in the upper part of FIG. 5, the control unit 13 is positioned beneath the control plate 4 in FIG. 5, and the typewriter unit 1 is positioned in the lower right corner of FIG. 5. The contact terminals 12 of the control plate 4 are connected to input contact terminals 15 of the control unit 13 via the leads 14. The input contact terminals 15 include terminals $15_I$ to $15_{XIV}$. The input contact terminals 15 are connected to control switches 20 which are connected to control contact terminals 30. The control switches 20 include switches $20d_1$, $20d_2$, $20e_1$, $20e_2$, $20f_1$, $20f_2$, $20g_1$, $20g_2$, $20g_3$, $20g_4$, $20h_1$, $20h_2$, $20h_3$ and $20h_4$ and the control contact terminals 30 include terminals $30d_1$, $30d_2$, $30e_1$, $30e_2$, $30f_1$, $30f_2$, $30g_1$, $30g_2$, $30g_3$, $30g_4$, $30h_1$, $30h_2$, $30h_3$ and $30h_4$.

A second plurality of exchangeable flexible leads 17 are provided between selected ones of the control contact terminals 30 and a plurality of connecting contact terminals 31. The connecting contact terminals 31 include terminals $31_I$ to $31_V$. The second plurality of exchangeable flexible leads 17 enables the electrical connection of any selected control contact terminals 30 or any selected connecting contact terminals 31. The connecting contact terminals $31_I$ to $31_V$ are directly connected to corresponding operation contact terminals $18_I$ to $18_V$ to which equipment (not shown in the figures) is connected for performing the selected operation or control process or for providing the selected program. The selected program may be provided by any suitable means such as, for example, magnetic recording or perforation of suitable tape or other carrier.

In the embodiment of FIG. 5, the operation, control process or program providing equipment (not shown) may comprise tape or card perforators $G_1$ and $G_2$. The tape or card perforator $G_1$ is operated through the operation contact terinal $18_{III}$, to which it is connected. The perforator $G_2$ is operated through the operation contact terminal $18_{IV}$, to which it is connected. The combined perforators $G_1$ and $G_2$ are operated through the operation terminal $18_V$, to which they are connected. The perforators are stopped via the operation contact terminal $18_{II}$ and said perforators are deenergized or deactuated via the operation contact terminal $18_I$.

The control switches 20, the control contact terminals 30, the connecting contact terminals 31 and the second plurality of exchangeable flexible leads 17 are positioned in the control unit 13 with other control components. The control unit 13 also includes the control relays 20 and a plurality of selection relays 22. The selection relays 22 include selection relay energizing windings 22I, 22II and 22III in the embodiment of FIG. 5. Each of the selection relays 22 includes a plurality of selection switches, contacts or amatures a, b, c and d which are controlled by its energizing winding.

The selection relay 22I energizing winding is connected to a selection contact terminal 36I via a selection lead 25I, the selection relay 22II energizing winding is connected to a selection contact terminal 36II via a selection lead 25II, and the selection relay 22III energizing winding is connected to a selection contact terminal 36III via a selection lead 25III. The selection contact terminals 36 of the control unit 13 are connected to typewriter contact terminals 37 via the leads 45. The typewriter contact terminals 37, which include terminals 37I, 37II and 37III, are included in the typewriter unit 1.

The control relays 20D, 20E, 20F, 20G and 20H are connected in parallel with the selection relays 22 via a third plurality of exchangeable flexible leads 21 which are terminated by terminals a—a and b—b. The control relays 20 may all be connected to each of the selection relays 22I to 22III. A preselection relay 27 comprises a preselection relay energizing winding and preselection relay switches, armatures or contacts 27I, 27II and 27III. A preselection switch 27I, 27II or 27III is connected to the corresponding one of the selection relays 22I to 22III energizing windings. The preselection relay 27 energizing winding is connected to selection contact terminal 36V which is connected to typewriter contact terminal 37V via one of the leads 45. The selection switches 22, which are connected to the selection relay 22 energizing windings, are connected to selection contact terminal 36A via a lead 38. The selection contact terminal 36A is connected to typewriter contact terminal 37A via one of the leads 45.

The selection relays 22I to 22III and selection switches 22Ia to 22IIId are connected in parallel between the lead 38 and the negative terminal of a source of voltage. Thus, the energizing winding of a selection relay 22I is connected in series with the normally open selection switch 22Id of said selection relay, the normally closed selection switch 22IIb of the selection relay 22II and the normally closed selection switch 22IIIc of the selection relay 22III and also with the parallel connection of the selection switch 22Ia of the selection relay 22I and the preselection switch 27I of the preselection relay 27. The energizing winding of the selection relay 22II is connected in series with the normally open selection switch 22IId of the selection relay 22II, the normally closed selection switch 22Ic of the selection relay 22I and the normally closed selection switch 22IIIb of the selection relay 22III and also with the parallel connection of the selection switch 22IIa of the selection relay 22II and the preselection switch 27II of the preselection relay 27. The energizing winding of the selection relay 22III is connected in series with the normally open selection switch 22IIId of the selection relay 22III, the normally closed selection switch 22IIc of the selection relay 22II and the normally closed selection switch 22Ib of the selection relay 22I and also with the parallel connection of the selection switch 22IIIa of the selection relay 22III and the preselection switch 27III of the preselection relay 27.

As shown in FIG. 5, the typewriter unit 1 includes a plurality of typewriter switches 23I to 23III operated by corresponding typewriter keys 24I to 24III. The typewriter switch 23I is connected to the typewriter contact terminal 37I, the typewriter switch 23II is connected to the typewriter contact terminal 37II, and the typewriter switch 23III is connected to the typewriter contact terminal 37III. The typewriter keys 24I to 24III are usually included in the normal typewriter keyboard. It is preferred that the typewriter keys 24I to 24III be the normal numeral keys 1, 2 and 3 of the typewriter keyboard.

The typewriter keys 24I to 24III are coupled with any suitable type of keyboard locking apparatus 63 and are connected to the preselection relay 27 energizing winding via a switch 28. The switch 28 is so positioned in the typewriter unit 1 that it is closed only at predetermined positions of the typewriter carriage between its pretyping end position and its type starting position. The preselection relay 27 energizing winding may be energized only during the period between the pretyping end position and the type starting position of the typewriter carriage. When the preselection relay 27 is energized it prepares the circuit for the selection relays 22I to 22III by closing the preselection switches 27I, 27II and 27III.

The keyboard locking apparatus 63 prevents the keys 24I to 24III from their normal typing operation when it is actuated by the closing of the switch 28. When the keys 24I to 24III are locked by the keyboard locking apparatus 63, they are able only to control the typewriter switches 23I to 23III. If one of the typewriter switches 23I to 23III is closed, the corresponding selection relay 22I to 22III is energized and remains energized through its corresponding self-holding selection switch 22Ia, 22IIa or 22IIIa.

When the typewriter carriage shifts to its type starting position, it opens the switch 28 and the preselection relay 27 is deenergized. The selected selection relay 22I, 22II or 22III remains energized, however, due to its corresponding self-holding selection switch 22Ia, 22IIa or 22IIIa. The energized one of the selection relays 22I, 22II or 22III closes the corresponding one of normally open contacts 22Id, 22IId or 22IIId and opens the normally closed contacts 22Ib and 22Ic, 22IIb and 22IIc, and 22IIIb and 22IIIc of the non-selected selection relays. The selected selection relay 22I, 22II or 22III thus remains energized although the corresponding one of typewriter switches 23I, 23II or 23III is opened.

The circuit arrangement prevents the energization of several selection relays 22 at one time. The current supply line 6 of the control plate 4 is connected to the typewriter unit 1 via a terminal 33. An end-of-message switch 34 is connected between the terminal 33 and a cut-off switch 32. The end-of-message switch 34 is controlled by a switching key of the typewriter keyboard. The cut-off switch 32 operates to connect the positive terminal of a source of voltage to the circuit to energize said circuit, or to connect said circuit to ground and thereby deenergize said circuit. The cut-off switch 32 may be opened either by a cut-off key of the typewriter keyboard or by the typewriter carriage. The opening of the cut-off switch 32 deenergizes the circuit and returns said circuit to its initial condition. The circuit may be so arranged, without difficulty, that it is returned to its initial condition upon a new selection of selection relays 22 by the operation of the typewriter switches 23.

As illustrated in FIG. 5, any desired position contact or contacts 5 may be electrically connected with any desired connecting block or blocks 10, and any of said connecting blocks may be interconnected and any of said position contacts may be interconnected via the connecting joining strips 41 and the connecting strip leads 42.

Any control contact terminal 30 may be connected with any connecting contact terminal 31 via the second plurality of exchangeable flexible leads 17. This enables the selection of a control contact terminal 30 to connect a selected control switch 20 into the circuit. The selection of the control switch 20 depends upon the selection of a selection relay 22 and the energization of the corresponding control relay 20 connected in parallel with the selected selection relay 22 via the third plurality of exchangeable flexible leads 21.

Although, in the embodiment of FIG. 5, three specific operations, programs or control processes are available for selection, any suitable number of specific operations, programs or control processes may be provided for. The connection and utilization of the first, second and third pluralities of exchangeable flexible leads 9, 17 and 21 enable the selection and performance of desired operations, programs or control processes via the operation contact terminals 18I to 18V and the equipment (not shown) connected to said terminals.

The position contacts 5 of the control plate 4 are sequentially scanned by the contact brush 7 at the typewriter carriage 2 to determine the steps of a selected operation program or control process in accordance with the connection of the first plurality of exchangeable flexible leads 9. The position contacts 5 selected for the purpose of illustration in the embodiment of FIG. 5 as the desired operation, program or control process steps are the position contacts 5a to 5k.

As desired, the closing of the switch 28 energizes the preselection relay 27 which closes the preselection switches 27I to 27III to prepare the circuit for the selection relays 22I, 22II and 22III. If a desired operation, program or control process is then selected by the operation of a key of the typewriter keyboard, the corresponding selection relay 22I, 22II or 22III is energized. Thus, for example, if the key 24I is operated, the selection relay 22I is energized and closes its self-holding switch 22Ia and its normally open selection switch 22Id. At the same time, the selection relay 22I opens its normally closed selection switches or armatures 22Ib and 22Ic in the circuit branches of the selection relays 22III and 22II and thereby prevents the operation of the selection relays 22II and 22III. Concurrently with the energization of the selection relay 22I, the corresponding relay 20D is energized and closes its control switches $20d_1$ and $20d_2$.

When the typewriter key 24I is operated, the typewriter carriage 2 shifts and the contact brush 7 shifts, both in the direction of the arrow in FIG. 5. This shifting of the carriage 2 opens the switch 28 and thereby deenergizes the preselection relay 27 while the selection relay 22I remains energized due to its self-holding selection switch 22Ia.

When the typewriter carriage 2 shifts, the contact brush 7 scans the position contacts 5 in succession. When the contact brush 7 contacts the position contacts 5a, and after the contact brush 7 breaks contact with the position contact 5a, the operation, program or control process at the operation contact terminal 18III for the equipment (not shown) connected thereto such as, for example, the tape perforator $G_1$, is undertaken by such equipment. This is due to the closing of the circuit comprising the first plurality of exchangeable flexible leads 9, the connecting joining strips 41, the connecting strip leads 42, the connecting block $10_{XIV}$, the control switch $20d_1$, one of the second plurality of exchangeable flexible leads 17 and the connecting contact terminal $31_{III}$ which is connected directly to the operation contact terminal 18III.

The same operation essentially ensues when the other typewriter keys 24II and 24III are operated and the other control switches 20 are selectively closed. The scanning of the position contacts 5 by the contact brush 7 may provide the following operations, programs or control processes. Thus, for example, if the operation control circuit arrangement of the present invention is utilized to provide a programmed control of tape perforators 61 and 62 to record such programs for further use, the following programming schedule may be effected:

*Program I*

Position contact 5a is connected to perforator $G_1$, which is actuated.

*Program II*

Position contact 5a is connected to perforator $G_1$, which is actuated; position contact 5b is connected to perforator $G_2$, which is actuated; position contact 5c is connected to the perforator shut-off terminal 18I;

Position contact 5d is connected to perforator $G_1$, which is actuated; position contact 5e is connected to perforator $G_2$, which is actuated; position contact 5f is connected to the perforator shut-off terminal 18I;

Position contact 5g is connected to perforator $G_1$, which is actuated; position contact 5k is connected to the perforator shut-off terminal 18I.

*Program III*

Position contact 5a is connected to perforator $G_1$ which is actuated; position contact 5e is connected to perforator $G_2$, which is actuated; position contact 5h is connected to the perforator shut-off terminal 18I;

Position contact 5i is connected to perforator $G_2$, which is actuated; position contact 5j is connected to the perforator shut-off terminal 18I; position contact 5k is connected to perforator $G_2$, which is actuated.

The operation control circuit arrangement of the present invention thus permits an exceptionally large selection of operations, programs or control processes. This is achieved by simple structure which is removably affixed to typewriters, computers or similar apparatus.

It is possible to extend the range of operation of the operation control circuit arrangement of the present invention by adding selection and control relays. Furthermore, several equipments may be controlled simultaneously by the circuit arrangement of the present invention.

While the invention has been described by means

What we claim is:

1. An operation control circuit arrangement for a typewriter unit or the like having a keyboard having a plurality of keys and a plurality of key operated typewriter switches, said circuit arrangement comprising
 a control member removably affixed to said typewriter unit;
 a plurality of spaced position contacts on said control member;
 a plurality of spaced contact terminals on said control member;
 a plurality of exchangeable flexible electrically conducting leads for electrically connecting selected ones of said position contacts to selected ones of said contact terminals;
 a control unit having a plurality of input contact terminals, a plurality of operation contact terminals adapted to be connected to equipment for performing a desired process, a plurality of control switches connected between said input contact terminals and said operation contact terminals, and selection and control means for controlling the operation of said control switches to select a desired control process by closing selected ones of said control switches;
 first connecting means electrically connecting the contact terminals of said control member to the input contact terminals of said control unit; and
 second connecting means electrically connecting selected ones of the typewriter switches of said typewriter unit to the selection and control means of said control unit in a manner whereby operation of said selection and control means is controlled by operation of said typewriter switches to close selected ones of the control switches of said control unit to electrically connect selected ones of the position contacts of said control member to selected ones of the operation contact terminals of said control unit thereby to energize said selected ones of said operation contact terminals in accordance with the operation of selected keys of said typewriter keyboard.

2. An operation control circuit arrangement for a typewriter unit or the like having a carriage, a keyboard having a plurality of keys and a plurality of key operated typewriter switches, said circuit arrangement comprising a control member removably affixed to the back of said typewriter unit, said control member comprising current supply means on said control member;
 a plurality of spaced position contacts positioned in a detemined arrangement on said control member;
 a contact brush movably supported at the carriage of said typewriter unit for electrically connecting said current supply means with any one of the position contacts of said control member;
 a plurality of spaced contact terminals on said control member;
 a plurality of exchangeable flexible electrically conducting leads for electrically connecting selected ones of said position contacts to selected ones of said contact terminals;
 a control unit having a plurality of input contact terminals, a plurality of operation contact terminals adapted to be connected to equipment for performing a desired process, a plurality of control switches connected between said input contact terminals and said operation contact terminals, and selection and control means for controlling the operation of said control switches to select a desired control process by closing selected ones of said control switches;
 first connecting means electrically connecting the contact terminals of said control member to the input contact terminals of said control unit; and
 second connecting means electrically connecting selected ones of the typewriter switches of said typewriter unit to the selection and control means of said control unit in a manner whereby operation of said selection and control means is controlled by operation of said typewriter switches to close selected ones of the control switches of said control unit to electrically connect selected ones of the position contacts of said control member to selected ones of the operation contact terminals of said control unit thereby to energize said selected ones of said operation contact terminals in accordance with the operation of selected keys of said typewriter keyboard.

3. An operation control circuit arrangement for a typewriter unit or the like having a carriage, a keyboard having a plurality of keys and a plurality of key operated typewriter switches, said circuit arrangement comprising
 a control member removably affixed to the back of said typewriter unit, said control member having spaced substantially parallel longitudinal sides, spaced substantially parallel transverse sides and spaced substantially parallel top and bottom surfaces, said control member comprising current supply means on a planar surface of said control member;
 a plurality of spaced position contacts positioned in a determined arrangement on said surface of said control member;
 a contact brush movably supported at the carriage of said typewriter unit for electrically connecting said current supply means with any one of the position contacts of said control member;
 a plurality of spaced contact terminals on said control member;
 a plurality of exchangeable flexible electrically conducting leads for electrically connecting selected ones of said position contacts to selected ones of said contact terminals;
 a control unit having a plurality of input contact terminals, a plurality of operation contact terminals adapted to be connected to equipment for performing a desired process, a plurality of control switches connected between said input contact terminals and said operation contact terminals, and selection and control means for controlling the operation of said control switches to select a desired control process by closing selected ones of said control switches;
 first connecting means electrically connecting the contact terminals of said control member to the input contact terminals of said control unit; and
 second connecting means electrically connecting selected ones of the typewriter switches of said typewriter unit to the selection and control means of said control unit in a manner whereby operation of said selection and control means is controlled by operation of said typewriter switches to close selected ones of the control switches of said control unit to electrically connect selected ones of the position contacts of said control member to selected ones of the operation contact terminals of said control unit thereby to energize said selected ones of said operation contact terminals in accordance with the operation of selected keys of said typewriter keyboard.

4. An operation control circuit arrangement for a typewriter unit or the like having a carriage, a keyboard having a plurality of keys and a plurality of key operated typewriter switches, said circuit arrangement comprising
 a control member removably affixed to the back of said typewriter unit, said control member having spaced substantially parallel longitudinal sides, spaced substantially parallel transverse sides and spaced substantially parallel top and bottom surfaces, said control member comprising current supply means on a planar surface of said control member adjacent to a longitudinal side thereof;
 a plurality of spaced position contacts positioned in a determined arrangement on said surface of said control member adjacent and transverse to said longitudinal side thereof, each of said position contacts comprising a strip of electrically conductive material terminating in a connecting strip;

a contact brush movably supported at the carriage of said typewriter unit for electrically connecting said current supply means with any one of the position contacts of said control member;

a plurality of spaced connecting blocks positioned on said surface of said control member adjacent to the opposite longitudinal side thereof;

a plurality of contact terminals on a surface of said control member at a transverse side thereof;

a plurality of exchangeable flexible electrically conducting leads for electrically connecting selected ones of said position contacts to selected ones of said contact terminals;

a control unit having a plurality of input contact terminals, a plurality of operation contact terminals adapted to be connected to equipment for performing a desired process, a plurality of control switches connected between said input contact terminals and said operation contact terminals, and selection and control means for controlling the operation of said control switches to select a desired control process by closing selected ones of said control switches;

first connecting means electrically connecting the contact terminals of said control member to the input contact terminals of said control unit; and second connecting means electrically connecting selected ones of the typewriter switches of said typewriter unit to the selection and control means of said control unit in a manner whereby operation of said selection and control means is controlled by operation of said typewriter switches to close selected ones of the control switches of said control unit to electrically connect selected ones of the position contacts of said control member to selected ones of the operation contact terminals of said control unit thereby to energize said selected ones of said operation contact terminals in accordance with the operation of selected keys of said typewriter keyboard.

5. An operation control circuit arrangement for a typewriter unit or the like having a carriage, a keyboard having a plurality of keys and a plurality of key operated typewriter switches, said circuit arrangement comprising a control member removably affixed to the back of said typewriter unit, said control member having spaced substantially parallel longitudinal sides, spaced substantially parallel transverse sides and spaced substantially parallel top and bottom surfaces, said control member comprising current supply means on a planar surface of said control member adjacent to a longitudinal side thereof;

a plurality of spaced position contacts positioned in a a determined arrangement on said surface of said control member adjacent and transverse to said longitudinal side thereof, each of said position contacts comprising a strip of electrically conductive material terminating in a connecting strip;

a contact brush movably supported at the carriage of said typewriter unit for electrically connecting said current supply means with any one of the position contacts of said control member;

a plurality of spaced connecting blocks positioned on said surface of said control member adjacent to the opposite longitudinal side thereof;

a plurality of contact terminals on a surface of said control member at a transverse side thereof;

a first plurality of exchangeable flexible electrically conducting leads for electrically connecting selected ones of said position contacts at the connecting strips thereof to selected ones of said connecting blocks;

a plurality of lead strips electrically connecting said connecting blocks to said contact terminals;

a control unit having a plurality of input contact terminals, a plurality of operation contact terminals adapted to be connected to equipment for performing a desired process, a plurality of control switches connected between said input contact terminals and said operation contact terminals, and selection and control means for controlling the operation of said control switches to select a desired control process by closing selected ones of said control switches;

first connecting means electrically connecting the contact terminals of said control member to the input contact terminals of said control unit; and second connecting means electrically connecting selected ones of the typewriter switches of said typewriter unit to the selection and control means of said control unit in a manner whereby operation of said selection and control means is controlled by operation of said typewriter switches to close selected ones of the control switches of said control unit to electrically connect selected ones of the position contacts of said control member to selected ones of the operation contact terminals of said control unit thereby to energize said selected ones of said operation contact terminals in accordance with the operation of selected keys of said typewriter keyboard.

6. An operation control circuit arrangement for a typewriter unit or the like having a carriage, a keyboard having a plurality of keys and a plurality of key operated typewriter switches, said circuit arrangement comprising a control member removably affixed to the back of said typewriter unit, said control member having spaced substantially parallel longitudinal sides, spaced substantially parallel transverse sides and spaced substantially parallel top and bottom surfaces, said control member comprising current supply means on a planar surface of said control member adjacent to a longitudinal side thereof;

a plurality of spaced position contacts positioned in a determined arrangement on said surface of said control member adjacent and transverse to said longitudinal side thereof, each of said position contacts comprising a strip of electrically conductive material terminating in a connecting strip, short joining strips extending from alternate ones of said connecting strips to position the corresponding alternate ones of said connecting strips in linear relation, and long joining strips extending from the other ones of said connecting strips to position the corresponding other ones of said connecting strips in linear relation;

a contact brush movably supported at the carriage of said typewriter unit for electrically connecting said current supply means with any one of the position contacts of said control member;

a plurality of spaced connecting blocks positioned on said surface of said control member adjacent to the opposite longitudinal side thereof;

a plurality of contact terminals on a surface of said control member at a transverse side thereof;

a first plurality of exchangeable flexible electrically conducting leads for electrically connecting selected ones of said position contacts at the connecting strips thereof to selected ones of said connecting blocks;

a plurality of lead strips electrically connecting said connecting blocks to said contact terminals;

a control unit having a plurality of input contact terminals, a plurality of operation contact terminals adapted to be connected to equipment for performing a desired process, a plurality of control switches connected between said input contact terminals and said operation contact terminals, and selection and control means for controlling the operation of said control switches to select a desired control process by closing selected ones of said control switches;

first connecting means electrically connecting the contact terminals of said control member to the input contact terminals of said control unit; and second connecting means electrically connecting selected ones of the typewriter switches of said typewriter unit to the selection and control means of said control unit in a manner whereby operation of said selection and control means is controlled by operation of said typewriter switches to close selected ones of the control switches of said control unit to electrically connect selected ones of the position contacts of said control member to selected ones of the operation contact terminals of said control unit thereby to energize said selected ones of said operation contact terminals in accordance with the operation of selected keys of said typewriter keyboard.

7. An operation control circuit arrangement for a typewriter unit or the like having a carriage, a keyboard having a plurality of keys and a plurality of key operated typewriter switches, said circuit arrangement comprising a control member removably affixed to the back of said typewriter unit, said control member having spaced substantially parallel longitudinal sides, spaced substantially parallel transverse sides and spaced substantially parallel top and bottom surfaces, said control member comprising current supply means on a planar surface of said control member adjacent to a longitudinal side thereof;

a plurality of spaced position contacts positioned in a determined arrangement on said surface of said control member adjacent and transverse to said longitudinal side thereof, each of said position contacts comprising a strip of electrically conductive material terminating in a connecting strip;

a contact brush movably supported at the carriage of said typewriter unit for electrically connecting said current supply means with any one of the position contacts of said control member;

a plurality of spaced connecting blocks positioned on said surface of said control adjacent to the opposite longitudinal side thereof;

a plurality of connecting strip leads on a surface of said control member adapted to be connected to determined points on determined ones of said connecting blocks;

a plurality of connecting joining strips on a surface of said control member;

a plurality of contact terminals on a surface of said control member at a transverse side thereof;

a plurality of exchangeable flexible electrically conducting leads for electrically connecting selected ones of the connecting joining strips to selected ones of said position contacts;

a control unit having a plurality of input contact terminals, a plurality of operation contact terminals adapted to be connected to equipment for performing a desired process, a plurality of control switches connected between said input contact terminals and said operation contact terminals, and selection and control means for controlling the operation of said control switches to select a desired control process by closing selected ones of said control switches;

first connecting means electrically connecting the contact terminals of said control member of the input contact terminals of said control unit; and second connecting means electrically connecting selected ones of the typewriter switches of said typewriter unit to the selection and control means of said control unit in a manner whereby operation of said selection and control means is controlled by operation of said typewriter switches to close selected ones of the control switches of said control unit to electrically connect selected ones of the position contacts of said control member to selected ones of the operation contact terminals of said control unit thereby to energize said selected ones of said operation contact terminals in accordance with the operation of selected keys of said typewriter keyboard.

8. An operation control circuit arrangement as claimed in claim 7, further comprising electrical contact means on each of said connecting strips, connecting joining strips, connecting strip leads and connecting blocks for connection to electrical conducting leads.

9. An operation control circuit arrangement as claimed in claim 7, further comprising soldered electrical connections between said exchangeable flexible leads and selected ones of said connecting strips, selected ones of said connecting joining strips, selected ones of said connecting strip leads and selected points of selected ones of said connecting blocks.

10. An operation control circuit arrangement as claimed in claim 7, wherein each of said connecting strips, connecting joining strips, connecting strip leads and connecting blocks comprises a substantially flat layer of electrically conductive material, and further comprising a cover for said control member, said exchangeable flexible leads being positioned in the cover of said control member.

11. An operation control circuit arrangement as claimed in claim 7, wherein each of said connecting strips, connecting joining strips, connecting strip leads and connecting blocks is arranged on a surface of said control member as a printed circuit.

12. An operation control circuit arrangement for a typewriter unit or the like having a carriage, a keyboard having a plurality of keys and a plurality of key operated typewriter switches, said circuit arrangement comprising a control member removably affixed to the back of said typewriter unit, said control member having spaced substantially parallel longitudinal sides, spaced substantially parallel transverse sides and spaced substantially parallel top and bottom surfaces, said control member comprising current supply means on a planar surface of said control member adjacent to a longitudinal side thereof;

a plurality of spaced position contacts positioned in a determined arrangement on said surface of said control member adjacent and transverse to said longitudinal side thereof, each of said position contacts comprising a strip of electrically conductive material terminating in a connecting strip;

a contact brush movably supported at the carriage of said typewriter unit for electrically connecting said current supply means with any one of the position contacts of said control member;

a plurality of spaced connecting blocks positioned on said surface of said control adjacent to the opposite longitudinal side thereof;

a plurality of contact terminals on a surface of said control member at a transverse side thereof;

a first plurality of exchangeable flexible electrically conducting leads for electrically connecting selected ones of said position contacts at the connecting strips thereof to selected ones of said connecting blocks;

a plurality of lead strips electrically connecting said connecting blocks to said contact terminals;

a control unit having a plurality of input contact terminals, a plurality of operation contact terminals adapted to be connected to equipment for performing a desired process, a plurality of control switches connected between said input contact terminals and said operation contact terminals, and selection and control means for controlling the operation of said control switches to select a desired control process by closing selected ones of said control switches, said selection and control means comprising a plurality of control relays for controlling the operation of said control switches, a plurality of selection relays each having an energizing circuit and selection switches controlled in operation by said selection relays connected in the energizing circuits of the others of said selection relays and in their own energizing circuits, and another plurality of exchangeable flexible electrically conducting leads connecting said control relays across said selection relays;

first connecting means electrically connecting the contact terminals of said control member to the input contact terminals of said control unit; and second connecting means electrically connecting selected ones of the typewriter switches of said typewriter unit to the selection and control means of said control unit in a manner whereby operation of said selection and control means is controlled by operation of said typewriter switches to close selected ones of the control switches of said control unit to electrically connect selected ones of the control switches of said control unit to electrically connect selected ones of the position contacts of said control member to selected ones of the operation contact terminals of said control unit thereby to energize said selected ones of said operation contact terminals in accordance with the operation of selected keys of said typewriter keyboard.

13. An operation control circuit arrangement as claimed in claims 12, further comprising a source of voltage connected to the energizing circuits of said selection relays, and wherein a selection switch of each of the selection relays connected in the energizing circuit thereof is connected between the said selection relay and said source of voltage and functions as a self-holding switch for the said selection switch.

14. An operation control circuit arrangement for a typewriter unit or the like having a carriage, a keyboard having a plurality of keys and a plurality of key operated typewriter switches, said circuit arrangement comprising a control member removably affixed to the back of said typewriter unit, said control member having spaced substantially parallel longitudinal sides, spaced substantially parallel transverse sides and spaced substantially parallel top and bottom surfaces, said control member comprising current supply means on a planar surface of said control member adjacent to a longitudinal side thereof;

a plurality of spaced position contacts positions in a determined arrangement on said surface of said control member adjacent and transverse to said longitudinal side thereof, each of said position contacts comprising a strip of electrically conductive material terminating in a connecting strip;

a contact brush movably supported at the carriage of said typewriter unit for electrically connecting said current supply means with any one of the position contacts of said control member;

a plurality of spaced connecting blocks positioned on said surface of said control member adjacent to the opposite longitudinal side thereof;

a plurality of contact terminals on a surface of said control member at a transverse side thereof;

a first plurality of exchangeable flexible electrically conducting leads for electrically connecting selected ones of said position contacts at the connecting strips thereof to selected ones of said connecting blocks;

a plurality of lead strips electrically connecting said connecting blocks to said contact terminals;

a control unit having a plurality of input contact terminals, a plurality of operation contact terminals adapted to be connected to equipment for performing a desired process, a plurality of control switches connected between said input contact terminals and said operation contact terminals, and selection and control means for controlling the operation of said control switches to select a desired control process by closing selected ones of said control switches, said selection and control means comprising a plurality of control relays for controlling the operation of said control switches, a plurality of selection relays each having an energizing circuit and selection switches controlled in operation by said selection relays connected in the energizing circuits of the others of said selection relays and in their own energizing circuits, and another plurality of exchangeable flexible electrically conducting leads connecting said control relays across said selection relays;

first connecting means electrically connecting the contact terminals of said control member to the input contact terminals of said control unit; and second connecting means electrically connecting selected ones of said typewriter switches of said typewriter unit to the energizing circuits of said selection relays of said selection and control means of said control unit in a manner whereby operation of said selection and control means is controlled by operation of said typewriter switches to close selected ones of the control switches of said control unit to electrically connect selected ones of the position contacts of said control member to selected ones of the operation contact terminals of said control unit thereby to energize said selected ones of said operation contact terminals in accordance with the operation of selected keys of said typewriter keyboard.

15. An operation control circuit arrangement as claimed in claim 14, further comprising a preselection relay, a plurality of preselection switches controlled in operation by said preselection relay, a corresponding one of said preselection switches being connected in the energizing circuit of each of said selection relays, and switch means connected in said second connecting means and adapted to be operated by the carriage of said typewriter unit at determined positions of said carriage.

16. An operation control circuit arrangement as claimed in claim 15, further comprising typewriter unit keyboard locking means for preventing operation of the keys of the keyboard of said typewriter unit, and means connecting said keyboard locking means to the switch means connected in said second connecting means in a manner whereby said last-mentioned switch means controls the operation of said keyboard locking means.

17. An operation control circuit arrangement as claimed in claim 16, further comprising a second plurality of exchangeable flexible electrically conducting leads for electrically connecting said control switches to said operation contact terminals.

18. An operation control circuit arrangement as claimed in claim 17, further comprising electrical contact means electrically connected to each of said control switches and electrical contact means on said operation contact terminals for connection to said second plurality of exchangeable flexible leads.

19. An operation control circuit arrangement as claimed in claim 17, further comprising soldered electrical connections between the leads of said second plurality of exchangeable flexible leads and each of said control switches and operation contact terminals.

References Cited by the Examiner
UNITED STATES PATENTS

| | | | |
|---|---|---|---|
| 2,569,805 | 10/1951 | Doty et al. | 197—19 X |
| 2,905,299 | 9/1959 | Hildebrandt | 197—20 |
| 3,063,537 | 11/1962 | Allen | 197—19 |
| 3,120,301 | 2/1964 | Lorch | 197—20 |
| 3,197,618 | 7/1965 | Stanley et al. | 197—20 X |

ROBERT E. PULFREY, *Primary Examiner.*

DAVID KLEIN, *Examiner.*

E. S. BURR, *Assistant Examiner.*